United States Patent
Balan et al.

(10) Patent No.: US 10,078,377 B2
(45) Date of Patent: Sep. 18, 2018

(54) SIX DOF MIXED REALITY INPUT BY FUSING INERTIAL HANDHELD CONTROLLER WITH HAND TRACKING

(71) Applicant: MICROSOFT TECHNOLOGY LICENSING, LLC, Redmond, WA (US)

(72) Inventors: Alexandru Octavian Balan, Sammamish, WA (US); Constantin Dulu, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/274,294

(22) Filed: Sep. 23, 2016

(65) Prior Publication Data
US 2017/0357332 A1   Dec. 14, 2017

Related U.S. Application Data

(60) Provisional application No. 62/347,840, filed on Jun. 9, 2016.

(51) Int. Cl.
*G06F 3/033*   (2013.01)
*G06F 3/0346*   (2013.01)
(Continued)

(52) U.S. Cl.
CPC ....... *G06F 3/0346* (2013.01); *G02B 27/0093* (2013.01); *G02B 27/017* (2013.01); *G02B 27/0172* (2013.01); *G06F 3/005* (2013.01); *G06F 3/011* (2013.01); *G06F 3/017* (2013.01); *G06T 19/006* (2013.01);
(Continued)

(58) Field of Classification Search
CPC ... G06F 3/00; G06F 3/01; G06F 3/011; G06F 3/017; G06F 3/0346; G02B 27/00; G02B 27/01; G02B 27/017; G02B 27/0093; G02B 2027/0134; G02B 2027/0138; G02B 2027/014; G06T 19/00; G06T 19/006
See application file for complete search history.

(56) References Cited

U.S. PATENT DOCUMENTS 7,843,430 B2   11/2010   Jeng et al.
7,961,909 B2 *  6/2011   Mandella ............... G01B 21/04
                                                          178/18.01
(Continued)

OTHER PUBLICATIONS

Molyneaux, et al., "Interactive Environment-Aware Handheld Projectors for Pervasive Computing Spaces", in Proceedings of the 10th international conference on Pervasive Computing, Jun. 18, 2012, 18 pages.
(Continued)

*Primary Examiner* — Joe H Cheng
(74) *Attorney, Agent, or Firm* — Workman Nydegger

(57) ABSTRACT

Systems and methods are described that provide a wireless hand-held inertial controller for use with a head-mounted, augmented reality (AR) or virtual reality (VR) display or other conventional display that operates with six degrees of freedom by fusing (i) data related to the position of the hand-held inertial controller derived from a depth camera located on the display with (ii) data relating to the orientation of the hand-held inertial controller derived from an inertial measurement unit located in the hand-held inertial controller.

18 Claims, 9 Drawing Sheets

(51) Int. Cl.
*G02B 27/00* (2006.01)
*G02B 27/01* (2006.01)
*G06F 3/00* (2006.01)
*G06F 3/01* (2006.01)
*G06T 19/00* (2011.01)

(52) U.S. Cl.
CPC ............ *G02B 2027/014* (2013.01); *G02B 2027/0138* (2013.01); *G02B 2027/0187* (2013.01)

(56) References Cited

U.S. PATENT DOCUMENTS

| | | | |
|---|---|---|---|
| 8,555,205 | B2 | 10/2013 | Ye et al. |
| 8,696,458 | B2 | 4/2014 | Foxlin et al. |
| 8,878,906 | B2 | 11/2014 | Shotton et al. |
| 9,141,194 | B1 | 9/2015 | Keyes et al. |
| 9,292,936 | B2 | 3/2016 | Bronshtein |
| 2006/0282873 | A1 | 12/2006 | Zalewski et al. |
| 2011/0043475 | A1 | 2/2011 | Rigazio et al. |
| 2012/0075168 | A1* | 3/2012 | Osterhout ............ G02B 27/017 345/8 |
| 2012/0287284 | A1* | 11/2012 | Jacobsen ................ G06F 1/163 348/158 |
| 2013/0114043 | A1 | 5/2013 | Balan et al. |
| 2013/0142384 | A1 | 6/2013 | Ofek |
| 2013/0217488 | A1* | 8/2013 | Comsa ................... G06F 17/00 463/31 |
| 2013/0217998 | A1 | 8/2013 | Mahfouz et al. |
| 2014/0049558 | A1* | 2/2014 | Krauss ................... G06F 3/011 345/633 |
| 2014/0152531 | A1* | 6/2014 | Murray ................ G06F 1/1632 345/8 |
| 2014/0168261 | A1 | 6/2014 | Margolis et al. |
| 2014/0176418 | A1 | 6/2014 | Ramachandran et al. |
| 2014/0362110 | A1 | 12/2014 | Stafford |
| 2014/0364209 | A1 | 12/2014 | Perry |
| 2015/0085111 | A1 | 3/2015 | Lavery |
| 2015/0247729 | A1 | 9/2015 | Meduna et al. |
| 2015/0317834 | A1 | 11/2015 | Poulos et al. |
| 2015/0373321 | A1 | 12/2015 | Bridges |
| 2016/0098095 | A1* | 4/2016 | Gonzalez-Banos ..... G06F 3/017 345/156 |
| 2016/0228771 | A1* | 8/2016 | Watson ................... G06F 3/013 |
| 2016/0262608 | A1* | 9/2016 | Krueger ............... A61B 3/0041 |
| 2017/0148214 | A1* | 5/2017 | Muniz-Simas ....... G06T 19/006 |
| 2017/0220119 | A1* | 8/2017 | Potts ....................... G06F 3/016 |
| 2017/0307891 | A1* | 10/2017 | Bucknor ................... G01S 1/70 |
| 2017/0358139 | A1* | 12/2017 | Balan ................ G02B 27/0172 |

OTHER PUBLICATIONS

Lee, et al, "Using a Mobile Device as an Interface Tool for HMD-based AR Applications", Available at: <<http://dl.acm.org/citation.cfm?id=1178833. Retrieved on Jan. 10, 2013.

"International Search Report and the Written Opinion" issued in PCT Application No. PCT/US2017/035337 dated Aug. 9, 2017.

* cited by examiner

SIX DOF MIXED REALITY INPUT BY FUSING INERTIAL HANDHELD CONTROLLER WITH HAND TRACKING

BACKGROUND

Background and Relevant Art

Mixed reality is a technology that allows virtual imagery to be mixed with a real world physical environment in a display. Systems for mixed reality may include, for example, see through head mounted display (HMD) devices or smart phones with built in cameras. Such systems typically include processing units which provide the imagery under the control of one or more applications. Full virtual reality environments in which no real world objects are viewable can also be supported using HMD and other devices.

Such systems may also include one or more wireless hand-held inertial controllers that the user of the system can manipulate to interact with the HMD and provide user input to the HMD, including, but not limited to, controlling and moving a virtual cursor, selection, movement and rotation of objects, scrolling, etc.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above. Furthermore, the subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The invention is directed to systems and methods for providing a wireless hand-held inertial controller (sometimes hereinafter referred to as a "Controller" or "Controllers") for use with a HMD that operates with six degrees of freedom (6DOF) by fusing (i) data related to the position of the Controller derived from a forward-facing depth camera located in the HMD with (ii) data relating to the orientation of the Controller derived from an inertial measurement unit (IMU) located in the Controller.

In one embodiment, the system can include: a display connected to a processor; a hand-held input device configured to communicate with the processor to selectively provide one or more user inputs, the hand-held input device also including a first sensor for determining the orientation of the hand-held input device relative to a predetermined frame of reference and providing orientation data to the processor; a second sensor located in a known location relative to the display for determining the position of one or more hands of a user relative to the display and for providing position data to the processor, wherein the processor uses the orientation data and the position data to track the one or more hands of the user within a three dimensional field of view with six degrees of freedom.

In another embodiment, the method can include: detecting by an optical sensor of a head mounted display device, the presence of a user's hand within the field of view of the optical sensor; determining by the head mounted display device if a wireless hand-held inertial controller is active and paired with the head mounted display device; determining by the optical sensor of the head mounted display device the location and orientation of the user's hand relative to the head mounted display; tracking by the optical sensor of the head mounted display device movement of the user's hand relative to the head mounted display over a period of time to derive trajectory data representative of the trajectory of the user's hand during the period of time; receiving by the head mounted display device acceleration data for the period of time from the wireless hand-held inertial controller as derived by the inertial measurement unit of the wireless hand-held inertial controller; comparing the trajectory data with the acceleration data to compute a confidence level that the wireless hand-held device is located in the user's hand; and if the confidence level meets or exceeds a predetermined minimum threshold, fusing the location data derived from the optical sensor of the head mounted display device with the orientation data derived from the inertial measurement unit of the wireless hand-held inertial controller to track the user's hand within three dimensional space with six degrees of freedom.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Set forth below is an overview of a representative environment in which the systems and methods disclosed and/or claimed in this application can be implemented. It should be clearly understood and appreciated, however, that such descriptions are merely provided as an example of one representative environment and that the inventions described herein can be readily adapted to other HMD devices and AR and VR systems/environments, as well as other traditional computing environments and systems, including other conventional display devices.

Figure 1:
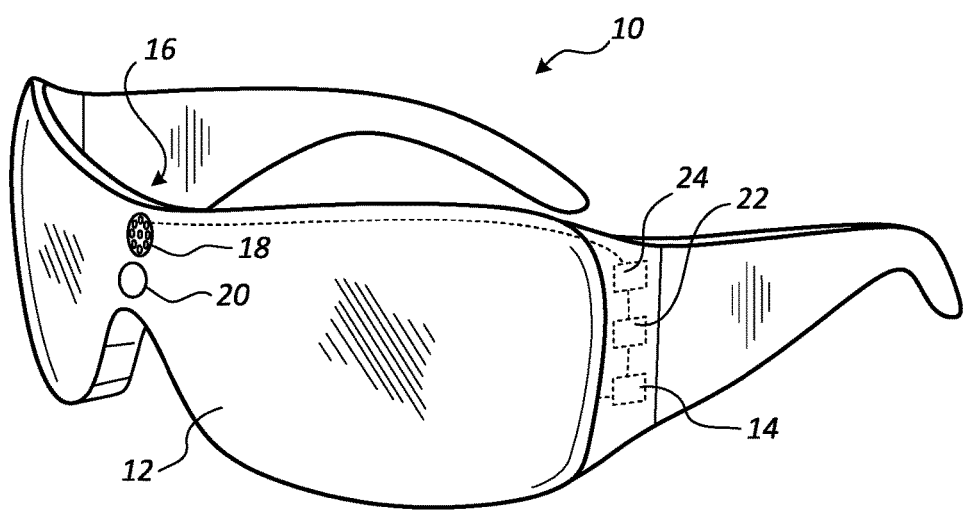
FIG. 1 is a schematic representation of one embodiment of a head mounted virtual or augmented reality display.
Figure 2:
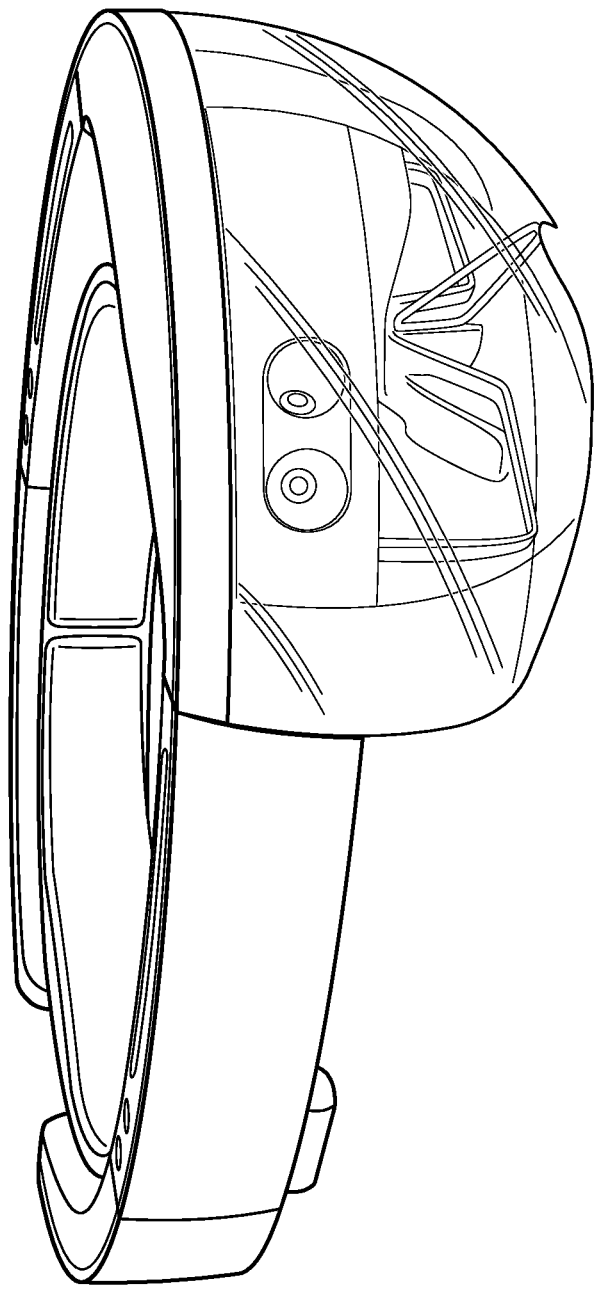
FIG. 2 is a general perspective rendering of one embodiment of the Microsoft Hololens.
Figure 3:
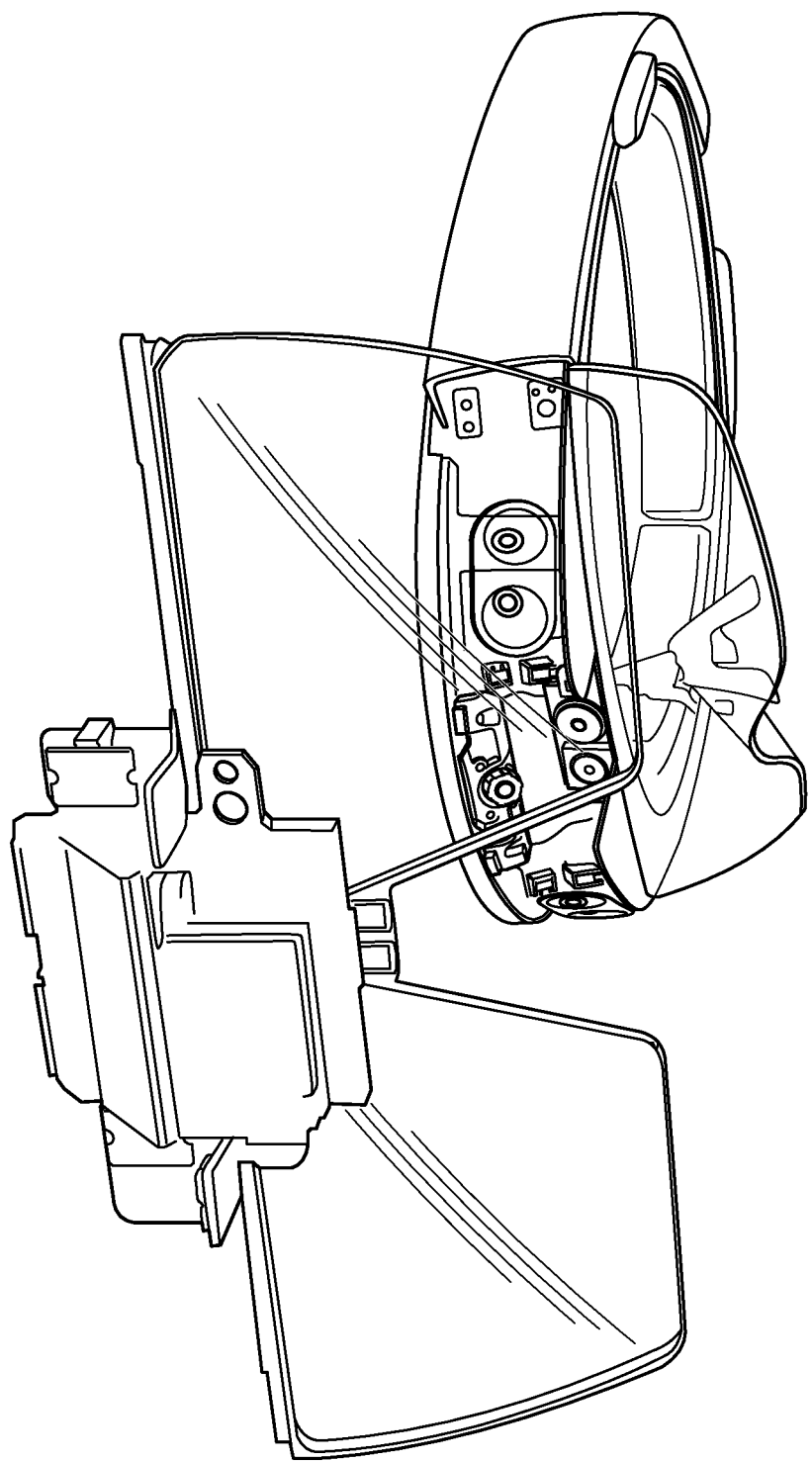
FIG. 3 is an exploded perspective rendering of one embodiment of the Microsoft Hololens, further illustrating one embodiment of a stereoscopic display system.
Figure 4:
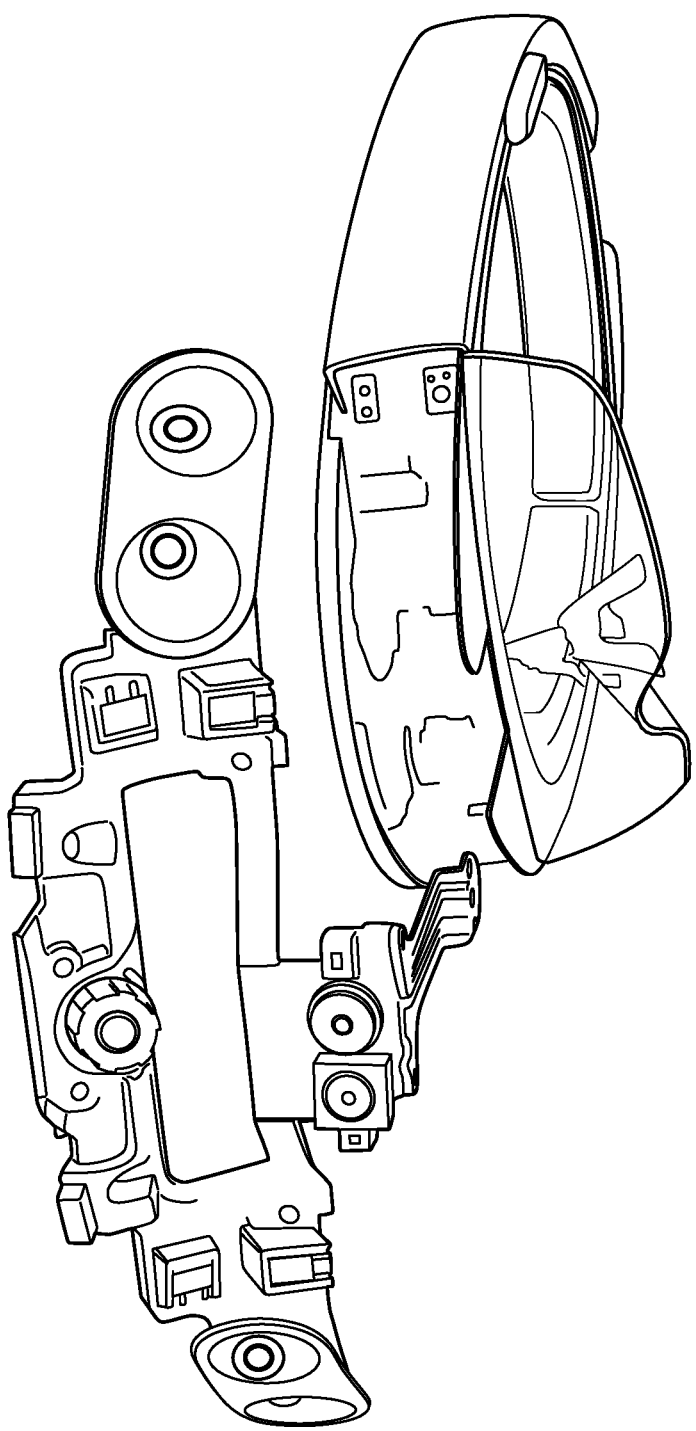
FIG. 4 is a general perspective rendering of one embodiment of the Microsoft Hololens, further illustrating one embodiment of an optical sensor system.
Figure 5:
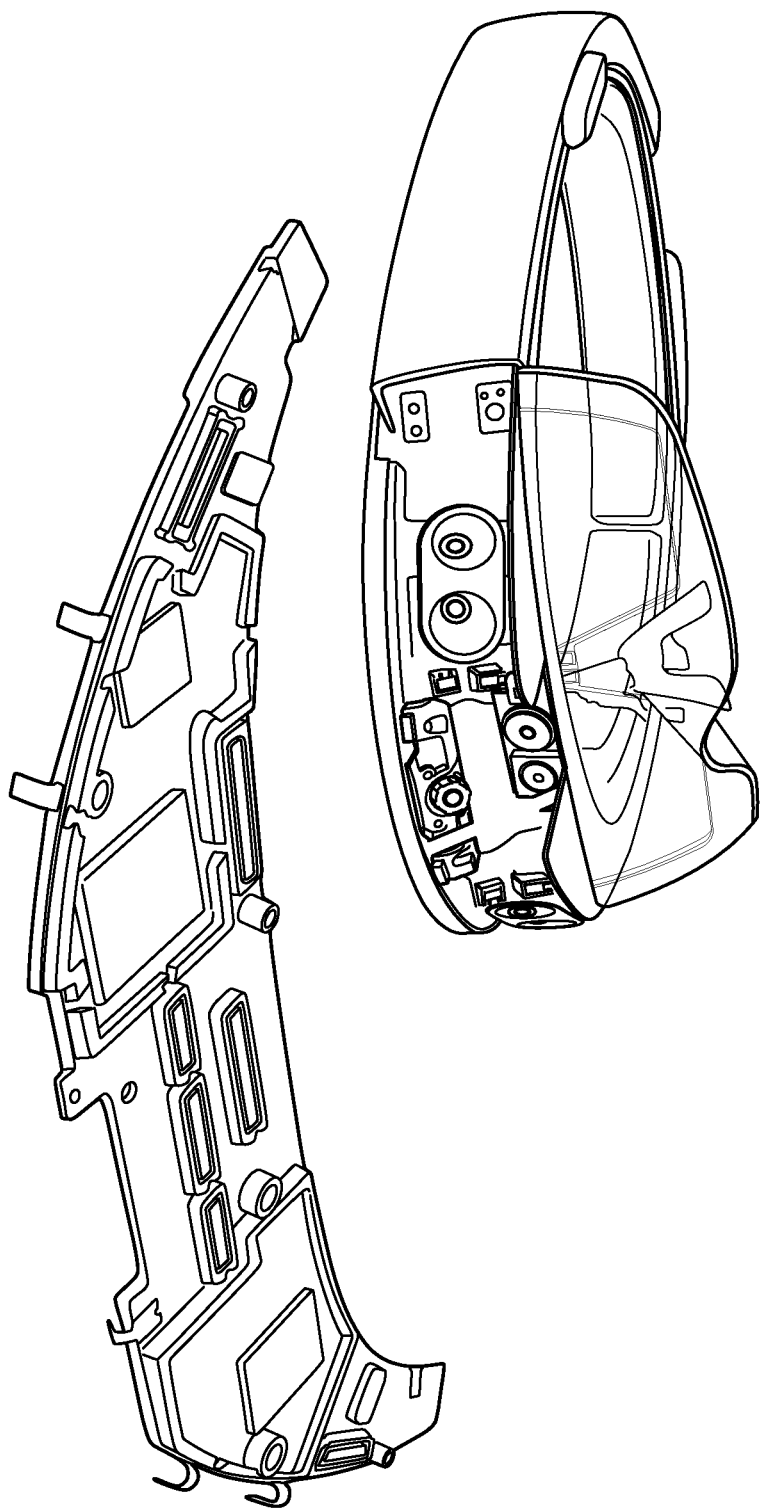
FIG. 5 is a general perspective rendering of one embodiment of the Microsoft Hololens, further illustrating one embodiment of a controller board and related on-board processors.

FIG. 1 schematically illustrates an example of a HMD device 10. FIGS. 2-5 are illustrations of the Microsoft Hololens, which represents one recent embodiment of a HMD.

Referring to FIGS. 1-5 generally, a HMD device 10 takes the form of wearable glasses or goggles, but it will be appreciated that other forms are possible. The HMD device 10 may be configured in an augmented reality configuration to present an augmented reality environment, and thus may include an at least partially see-through stereoscopic display 12 that may be configured to visually augment an appearance of a physical environment being viewed by the user through the at least partially see-through stereoscopic display 12. In some examples, the at least partially see-through stereoscopic display 12 may include one or more regions that are transparent (e.g., optically clear) and may include one or more regions that are opaque or semi-transparent. In other examples, the at least partially see-through stereoscopic display 12 may be transparent (e.g., optically clear) across an entire usable display surface of the stereoscopic display 12. Alternatively, the HMD device 10 may be configured in a virtual reality configuration to present a full virtual reality environment, and thus the stereoscopic display 12 may be a non-see-though stereoscopic display. The HMD device 10 may be configured to display virtual three dimensional environments to the user via the non-see-through stereoscopic display. The HMD device 10 may be configured to display a virtual representation such as a three dimensional graphical rendering of the physical environment in front of the user that may include additional virtual objects or may be configured to display camera-captured images of the physical environment along with additional virtual objects including the virtual cursor overlaid on the camera-captured images.

For example, the HMD device 10 may include an image production system 14 that is configured to display virtual objects to the user with the stereoscopic display 12. In the augmented reality configuration with an at least partially see-through display, the virtual objects are visually superimposed onto the physical environment that is visible through the display so as to be perceived at various depths and locations. In the virtual reality configuration, the image production system 14 may be configured to display virtual objects to the user with the non-see-through stereoscopic display, such that the virtual objects are perceived to be at various depths and locations relative to one another. In one embodiment, the HMD device 10 may use stereoscopy to visually place a virtual object at a desired depth by displaying separate images of the virtual object to both of the user's eyes. Using this stereoscopy technique, the HMD device 10 may control the displayed images of the virtual objects, such that the user will perceive that the virtual objects exist at a desired depth and location in the viewed physical environment. In one example, the virtual object may be a virtual cursor that is displayed to the user, such that the virtual cursor appears to the user to be located at a desired location in the virtual three dimensional environment. In the augmented reality configuration, the virtual object may be a holographic cursor that is displayed to the user, such that the holographic cursor appears to the user to be located at a desired location in the real world physical environment.

The HMD device 10 includes an optical sensor system 16 that may include one or more optical sensors. In one example, the optical sensor system 16 includes an outward facing optical sensor 18 that may be configured to detect the real-world background from a similar vantage point (e.g., line of sight) as observed by the user through the at least partially see-through stereoscopic display 12. The optical sensor system 16 may additionally include an inward facing optical sensor 20 that may be configured to detect a gaze direction of the user's eye. It will be appreciated that the outward facing optical sensor 18 may include one or more component sensors, including an RGB camera and a depth camera. The RGB camera may be a high definition camera or have another resolution. The depth camera may be configured to project non-visible light, such as infrared (IR) radiation, and capture reflections of the projected light, and based thereon, generate an image comprised of measured depth data for each pixel in the image. This depth data may be combined with color information from the image captured by the RGB camera, into a single image representation including both color data and depth data, if desired. In a virtual reality configuration, the color and depth data captured by the optical sensor system 16 may be used to perform surface reconstruction and generate a virtual model of the real world background that may be displayed to the user via the display 12. Alternatively, the image data captured by the optical sensor system 16 may be directly presented as image data to the user on the display 12.

The HMD device 10 may further include a position sensor system 22 that may include one or more position sensors, such as one or more inertial measurement unit (IMU) that incorporates a 3-axis accelerometer, 3-axis gyroscope and/or a 3-axis magnetometer, global positioning system(s), multilateration tracker(s), and/or other sensors that output position sensor information useable as a position, orientation, and/or movement of the relevant sensor.

Optical sensor information received from the optical sensor system 16 and/or position sensor information received from position sensor system 22 may be used to assess a position and orientation of the vantage point of HMD device 10 relative to other environmental objects. In some embodiments, the position and orientation of the vantage point may be characterized with six degrees of freedom (e.g., world-space X, Y, Z, ($\theta_{pitch}$, $\theta_{yaw}$ and $\theta_{roll}$). The vantage point may be characterized globally or independent of the real-world background. The position and/or orientation may be determined with an on-board computing system (e.g., on-board computing system 24) and/or an off-board computing system. Typically, frames of reference of all sensors located on board HMD device 10 are factory aligned and calibrated to resolve six degrees of freedom relative to world-space.

Furthermore, the optical sensor information and the position sensor information may be used by a computing system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location within the virtual world.

Additionally, the optical sensor information received from the optical sensor system 16 may be used to identify and track objects in the field of view of optical sensor system 16. For example, depth data captured by optical sensor system 16 may be used to identify and track motion of a user's hand. The tracked motion may include movement of the user's hand in three-dimensional space, and may be characterized with six degrees of freedom (e.g., world-space X, Y, Z, ($\theta_{pitch}$, $\theta_{yaw}$ and $\theta_{roll}$). The tracked motion may also be used to identify and track a hand gesture made by the user's hand. For example, one identifiable hand gesture may be moving a forefinger upwards or downwards. It will be appreciated that other methods may be used to identify and track motion of the user's hand. For example, optical tags may be placed at known locations on the user's hand or a glove worn by the user, and the optical tags may be tracked through the image data captured by optical sensor system 16.

It will be appreciated that the following examples and methods may be applied to both a virtual reality and an augmented reality configuration of the HMD device 10. In a virtual reality configuration, the display 12 of the HMD device 10 is a non-see-through display, and the three dimensional environment is a virtual environment displayed to the user. The virtual environment may be a virtual model generated based on image data captured of the real-world background by optical sensor system 16 of the HMD device 10.

Microsoft Hololens.

One example of a HMD is the Microsoft Hololens, which is a pair of mixed reality head-mounted smartglasses. Hololens has see-through holographic lenses that use an advanced optical projection system to generate multi-dimensional full-color holograms with very low latency so a user can see holographic objects in a real world setting.

Located at the front of the Hololens are sensors and related hardware, including cameras and processors. The Hololens also incorporates an inertial measurement unit (IMU), which includes an accelerometer, gyroscope, and a magnetometer, four "environment understanding" sensors, an energy-efficient depth camera with a 120°×120° angle of view, a forward-facing 2.4-megapixel photographic video camera, a four-microphone array, and an ambient light sensor. Hololens contains advanced sensors to capture information about what the user is doing and the environment the user is in. The built in cameras also enable a user to record (mixed reality capture (MRC)) HD pictures and video of the holograms in the surrounding world to share with others.

Enclosed within the visor is a pair of transparent combiner lenses, in which the projected images are displayed in the lower half. The Hololens must be calibrated to the interpupillary distance (IPD), or accustomed vision of the user.

Along the bottom edges of the side, located near the user's ears, are a pair of small, 3D audio speakers. The speakers do not obstruct external sounds, allowing the user to hear virtual sounds, along with the environment. Using head-related transfer functions, the Hololens generates binaural audio, which can simulate spatial effects; meaning the user, virtually, can perceive and locate a sound, as though it is coming from a virtual pinpoint or location.

On the top edge are two pairs of buttons: display brightness buttons above the left ear, and volume buttons above the right ear. Adjacent buttons are shaped differently—one concave, one convex—so that the user can distinguish them by touch.

At the end of the left arm is a power button and row of five, small individual LED nodes, used to indicate system status, as well as for power management, indicating battery level and setting power/standby mode. A USB 2.0 micro-B receptacle is located along the bottom edge. A 3.5 mm audio jack is located along the bottom edge of the right arm.

In addition to a central processing unit (CPU) and graphics processing unit (GPU), Hololens features a custom-made Microsoft Holographic Processing Unit (HPU), a coprocessor manufactured specifically for the Hololens. The main purpose of the HPU is processing and integrating data from the sensors, as well as handling tasks such as spatial mapping, gesture recognition, and voice and speech recognition. The HPU processes terabytes of information from the Hololens's sensors from real-time data.

The lenses of the Hololens use optical waveguides to color blue, green, and red across three different layers, each with diffractive features. A light engine above each combiner lens projects light into the lens, a wavelength which then hits a diffractive element and is reflected repeatedly along a waveguide until it is output to the eye. Similar to that of many other optical head-mounted displays, the display projection for the Hololens occupies a limited portion of the user's field of view (FOV), particularly in comparison to virtual reality head-mounted displays, which typically cover a much greater field of view.

The Hololens contains an internal rechargeable battery, but can be operated while charging. Hololens also features IEEE 802.11ac Wi-Fi and Bluetooth 4.1 Low Energy (LE) wireless connectivity.

With Hololens a user can create and shape holograms with gestures, communicate with apps using voice commands, and navigate with a glance, hand gestures, Controllers and/or other pointing devices. Hololens understands gestures, gaze, and voice, enabling the user to interact in the most natural way possible. With spatial sound, Hololens synthesizes sound so the user can hear holograms from anywhere in the room, even if they are behind the user.

Additional details about the Hololens are provided in U.S. Patent Application Ser. No. 62/029,351, filed Jul. 25, 2014, and entitled "Head Mounted Display Apparatus," which is incorporated herein by reference.

As mentioned above, the Hololens includes a depth camera, which is capable of detecting the 3D location of objects located within the depth camera's FOV. Technical details of exactly how the depth camera accomplishes such detection are known to those skilled in the art, but are not necessary for the present disclosure. Suffice it to say that the depth camera is able to accurately detect, on a pixel-by-pixel basis, the exact 3D location of each point on a physical object within the camera's field of view. While the Hololens uses a depth camera, stereoscopic optics can also be used to detect the distance of objects from the HMD and the locations of such objects in 3D space via triangulation. In either event, such sensors can detect the 3D location (x, y and z coordinates) of real objects located within the FOV relative to the HMD. In the case of a Controller, the depth camera of the HMD can be used to detect the 3D location of the Controller relative to the HMD.

Wireless Hand-Held Inertial Controllers.

As previously mentioned, the Hololens has the ability to track the movement of a user's hands through space and to identify and interpret a variety of hand poses, gestures and movements to manipulate virtual objects in the AR space. Additional details regarding hand tracking, hand gesture identification, classification and recognition and/or hand pose identification, classification and recognition are provided in U.S. patent application Ser. No. 12/975,086, filed Dec. 21, 2010 and entitled "Skeletal Control of Three-Dimensional Virtual World," U.S. patent application Ser. No. 13/327,098, filed Dec. 15, 2011 and entitled "Problem States for Pose Tracking Pipeline," U.S. patent application Ser. No. 13/959,555, filed Aug. 5, 2013 and entitled "Two-Hand Interaction with Natural User Interface," and/or U.S. patent application Ser. No. 14/748,646, filed Jun. 24, 2015 and entitled "Contextual Cursor Display Based on Hand Tracking," each of which is incorporated herein by reference.

One of the challenges with hand tracking and gesture recognition, however, is that they can require a relatively high level of processing overhead. To reduce such overhead, it can be useful to provide a Controller that can communicate with the HMD and allow manipulation of objects in the AR space. For example, in the case of Hololens, the headset uses Bluetooth LE to pair with a Controller, called a "Clicker," a thumb-sized finger-operating input device that can be used to enable the user to select, scroll, hold, and double-click to interact with virtual objects within the augmented reality space.

Figure 6:
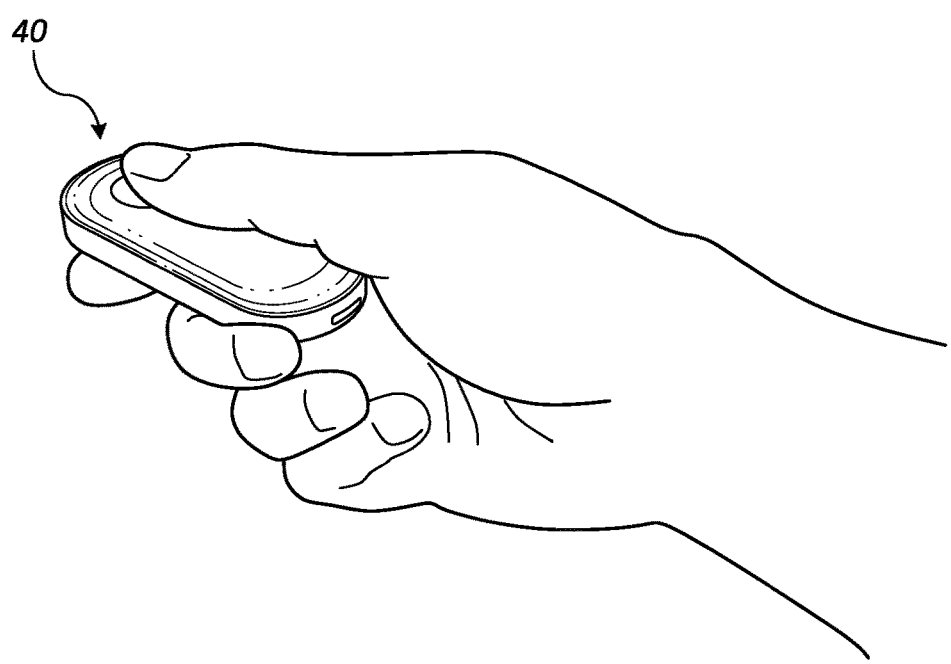
FIG. 6 is a perspective rendering of one embodiment of a wireless hand-held inertial controller.
Figure 7:
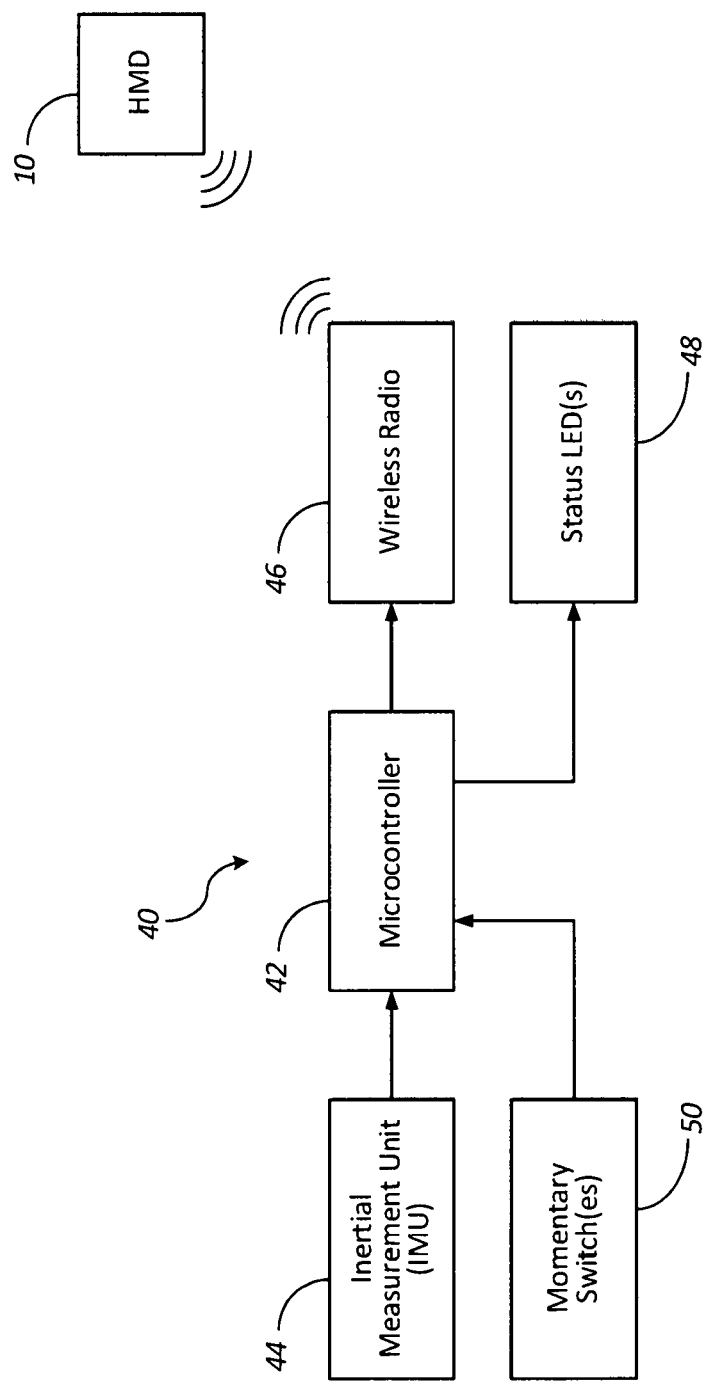
FIG. 7 is a functional block diagram illustrating the basic components of one embodiment of a wireless hand-held inertial controller.

Referring to FIGS. 6 and 7, Controller 40 can include an on-board microcontroller 42, its own IMU 44, a communications radio 46, a rechargeable battery (not shown), and one or more status LEDs 48. The IMU typically includes a 3-axis accelerometer and a 3-axis gyroscope, and may also include a magnetometer. User inputs and orientation data (pitch, yaw and roll) derived from the IMU can be wirelessly communicated by the microcontroller 42 to the CPU of the HMD 10 via wireless radio 46. Controller 40 can also include one more momentary switch(es) 50 for selective activation by the user to control a virtual cursor and/or to manipulate virtual objects in various ways (such as, for example, select, move, rotate, scroll, etc.). Controller 40 can also include an elastic finger loop (for holding the device) and a USB 2.0 micro-B receptacle for charging the internal battery.

From the accelerometer and gyroscope, the IMU 44 can detect the orientation of the Controller 40, but only with three degrees of freedom, namely, pitch (elevation angle), yaw (azimuth angle) and roll (rotation). Because the accelerometer can detect the gravity vector, the vertical axis of the frame of reference of the Controller 40 is easily identified and aligned. Similarly, the gyroscopes of the IMU 44 can readily detect the horizontal plane and, therefore, the horizontal plane is readily identified and aligned. If the IMU 44 also includes a magnetometer, then magnetic north can readily be identified and the frame of reference of the Controller 40 can be north aligned. If both the IMU of the HMD 10 and the IMU 44 of the Controller 40 include a magnetometer, then the frame of reference of the Controller 40 will automatically be aligned with the HMD's frame of reference (subject to some minor variations/offset and drift, which can be corrected over time).

If the IMU 44 of the Controller 40 does not include a magnetometer, then the IMU 44 arbitrarily assigns an x-axis when it powers up and then continuously tracks azimuth changes (angular rotation in the horizontal plane) from that initial frame of reference. In that case, the frame of reference of the Controller 40 will need to be aligned with or calibrated to the HMD's frame of reference, as discussed in more detail below.

At this point it bears repeating that the foregoing description of the Hololens and Clicker are provided merely as examples of a system and environment in which the systems and methods disclosed and/or claimed herein can be implemented. The inventions described herein can be readily adapted to other HMD devices and AR and VR systems/environments, as well as other traditional computing systems and environments, including other conventional display devices.

Figure 8:
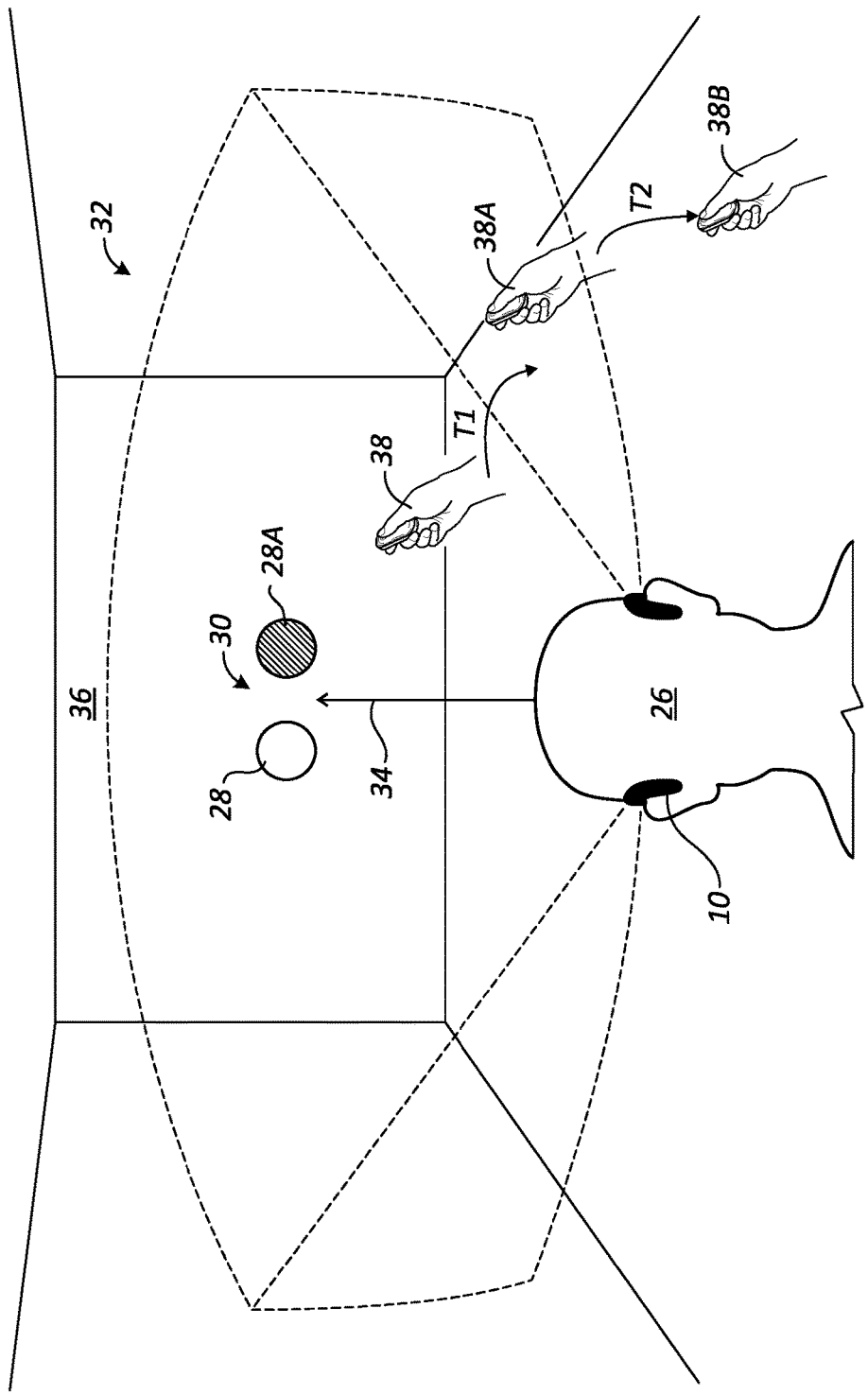
FIG. 8 is a graphical representation of one example of a possible field of view of one embodiment of an augmented reality display.

FIG. 8 illustrates an augmented reality configuration of a HMD device 10 worn by a user 26, displaying a virtual cursor, which is a holographic cursor 28 in this example, on the at least partially see-through stereoscopic display 12 so as to appear to at a location 30 in a three dimensional environment 32. In the specific example shown in FIG. 8, the three dimensional environment 32 is a room in the real world, and the holographic cursor 28 is displayed on the at least partially see-through stereoscopic display such that the holographic cursor 28 appears to the user 26, to be hovering in the middle of the room at the location 30. It will be appreciated that the location 30 for the holographic cursor 28 may be calculated based on a variety of suitable methods. For example, the location 30 may be calculated based on a predetermined distance and orientation relative to the user 26, such as being two feet in front of the user 26 as one specific example.

As another non-limiting example, the location 30 may be calculated based on a detected gaze direction 34 and a recognized object that intersects with the detected gaze direction. In this example, the recognized object may be a real object in the three dimensional environment. This example is illustrated in FIG. 8, with the recognized object being the wall 36 that is a part of the room that serves as the three dimensional environment 32. Accordingly, the intersection between the wall 36 and the detected gaze direction 34 of the user 26 may be used to calculate the location 30 for the holographic cursor 28. It may be advantageous to further ensure that the holographic cursor 28 is displayed to the user 26, such that the holographic cursor 28 is easily visible to the user 26. For example, to increase visibility, the location 30 of the holographic cursor 28 may be placed a threshold distance away from the recognized object to prevent the holographic cursor 28 from being occluded by any protrusions of the recognized object. Additionally, it may be advantageous to further calculate the location 30 of the holographic cursor 28 based on a plane that is orthogonal to the detected gaze direction 34 of the user 26. By placing the location 30 of the holographic cursor 28 on such a plane, a consistent view of the holographic cursor 28 may be maintained even as the user changes gaze direction.

Additionally, in the example illustrated in FIG. 8, the HMD device 10 worn by the user 26 may be configured to detect motion of the user's hand. Based on a series of images captured by the optical sensor system 16, the HMD device 10 may determine whether motion of hand 38 of the user 26 is trackable. For example, the user's hand at positions 38 and 38A are within the field of view of the optical sensor system 16. Accordingly, motion of the user's hand moving from position 38 to position 38A over time T1 is trackable by the HMD device 10. However, as position 38B may be outside of the field of view of the optical sensor system 16, motion of the user's hand moving from position 38A to position 38B over time T2 may not be trackable by the HMD device 10. It will be appreciated that the user's hand is determined to be trackable by the HMD when the HMD can monitor the hand for gesture input. Thus, the user's hand is deemed to be trackable, for example, when computer algorithms implemented in software executed on the processor of the HMD device 10 identify the hand in images captured by the onboard camera and begin tracking the hand, until a point in time at which those algorithms lose track of the hand. Techniques that may be used to track the hand the hand include searching for regions of similar color values and segmenting a portion of the image based on the color values from the rest of the image, as well as searching for regions of pixels that have changed, indicating foreground movement by a hand or other object. When depth information is available, the hand may be located using skeletal tracking techniques in addition or as an alternative to the above. A hand may be determined to be trackable when a confidence degree output by the algorithm indicates that the hand is being tracked with above a predetermined threshold level of confidence.

In the above embodiment, the HMD device 10 communicates to the user whether motion of the user's hand is trackable. In this embodiment, in response to at least determining that motion of the hand is trackable, the HMD device 10 modifies the visual appearance of the holographic cursor to indicate that motion of the hand is trackable. In the example illustrated in FIG. 8, the visual appearance of the holographic cursor is modified to appear as holographic cursor 28, which is an unfilled circle. Accordingly, as the user moves the hand from position 38 to position 38A over time T1, the user is shown holographic cursor having visual appearance 28 and is thus provided with the feedback that motion of the user's hand is currently trackable, and any hand gestures or hand movements will be tracked by the HMD device 10.

Further in this embodiment, in response to at least determining that motion of the hand is not trackable, the HMD device 10 modifies the visual appearance of the holographic cursor to indicate that motion of the hand is not trackable. As illustrated in FIG. 8, the visual appearance of the holographic cursor may be modified to appear as holographic cursor 28A, which has a different visual appearance than holographic cursor 28. In this example, the visual appearance of holographic cursor 28A is a filled circle. Accordingly, as the user moves the hand from position 38A to position 38B over time T2, the user is shown holographic cursor having visual appearance 28A and is thus provided with the feedback that motion of the user's hand is not currently trackable. It will be appreciated that while the example illustrated in FIG. 8 modifies the visual appearance of the holographic cursor to appear as a filled or unfilled circle, any suitable visual modification is possible. As a few other non-limiting examples, the visual appearance of the holographic cursor may be modified by changing a color, changing a shape, adding or removing an icon, or changing a size of the holographic cursor.

Mixed Reality Tracking and Input with Six Degrees of Freedom.

While the wireless Controllers found in the prior art may provide orientation information with 3DOF, they do not provide location information. 6DOF can be recovered, however, in accordance with the systems and methods described below. For example, and as set forth in more detail below, one embodiment of the invention is directed to a system 6DOF mixed reality input by fusing inertial handheld controller with hand tracking. The system can include: a display with an onboard processor; a hand-held input device configured to communicate with the processor to selectively provide one or more user inputs, the hand-held input device also including a first sensor for determining the orientation of the hand-held input device relative to a predetermined frame of reference and providing orientation data to the processor; and a second sensor located at a known location relative to the display for determining the position of one or more hands of a user relative to the display and for providing position data to the processor, wherein the processor uses the orientation data and the position data to track the one or more hands of the user within a three dimensional field of view with six degrees of freedom.

In one embodiment herein, the hand-tracking feature of the HMD can be used to accurately and precisely determine the 3D position of a Controller relative to the HMD by detecting the location of a user's hand in which the Controller is located. Then, the location information derived from the optical system of the HMD can be combined with the orientation data derived from the orientation sensors (e.g., IMU) incorporated in the Controller. In this manner, the system provides a Controller that operates with 6DOF.

Referring again to FIG. 8, for each frame of video captured by the optical sensor, for example at time T1, the image processor analyzes the video to determine the presence of one or more of the user's hands within the field of view of the optical sensor. If a user's hand is detected by the image processor, then the image processor can also determine whether the orientation and shape of the hand indicates the presence of a Controller, based on known geometrical constraints of the Controller and the position and orientation of the hand relative to the Controller. To determine which hand is holding the Controller, a classifier forming part of the environment tracking components of the HMD is trained to determine if a segmented hand is positioned in a hand pose consistent with holding a controller, using training examples of hands interacting with the controller. When using two controllers, one in each hand, it is possible to further differentiate which hand holds which controller by matching the hand trajectory as observed by the hand tracking sensor of the HMD with the acceleration data from the IMU of each controller over a period of time.

If the image processor detects the presence of Controller, then the depth camera of the HMD determines the exact position (x, y and z coordinates) of the Controller in 3D space relative to a known frame of reference. In addition to the location data derived from the depth camera, orientation data ($\theta_{pitch}$, $\theta_{yaw}$ and $\theta_{roll}$) for time T1 is also obtained from the IMU of the Controller. By combining the location data, derived from the depth camera, with the orientation data, derived from the IMU of the Controller, 6DOF are recovered, thereby allowing the HMD to track and interact with the Controller with 6DOF. This process can be repeated for each successive frame, or some other predetermined sampling of video captured by the optical sensor, to track and interact with the Controller with 6DOF.

In addition, once a particular hand of the user has been identified (e.g., right v. left), a unique hand identifier is associated with that hand for future identification and tracking. Similarly, once a particular Controller has been identified, a unique controller identifier is associated with that Controller for future identification and tracking. Finally, once the system determines to a desired confidence level that one particular Controller is located within a particular user hand, then an association is created between that particular Controller and that particular user hand, and that association is persisted unless and until subsequent sampling indicates that the association is no longer valid.

In addition to identifying the presence of a user's hand within the field of view of the optical sensor, the image processor can detect orientation of the user's hand by segmenting various parts of the user's hands and arms, determining the relative positions of each part and, from that information, derive the orientation of the user's hand(s). Information concerning the orientation of the user's hand can also be compared to the orientation of a Controller (based on orientation data derived from the IMU) to determine if the hand orientation data is consistent with the controller orientation data. This information, along with other positional data, helps to determine whether the controller should be associated with a particular hand. Once a certain level of confidence that a controller should be associated with a particular hand, then such association is made for future identification and tracking. Of course, it is possible that a user may transfer the Controller from one hand to the other. Therefore, such association(s) can be continually tested and updated based on successive video frames.

When a Controller is detected by the depth camera of the HMD, the location data (x, y and z coordinates) derived from the depth camera can be combined with the orientation data ($\theta_{pitch}$, $\theta_{yaw}$ and $\theta_{roll}$) derived from the IMU of the Controller to achieve a Controller that can be accurately detected with a relatively high degree of reliability and resolution in 6DOF.

The system comprises of an inertial handheld controller and an HMD with a hand tracking sensor and environment tracking sensor.

As discussed above, the Controller can include an IMU that can include a combination of accelerometers and gyroscopes. In addition, the IMU may also contain magnetometers. IMU data is fused to compute, with high frequency and low latency, the orientation ($\theta_{pitch}$, $\theta_{yaw}$ and $\theta_{roll}$) of the Controller relative to some initial reference frame that is gravity aligned. The presence of magnetometers ensures there is little drift in maintaining the north pole alignment.

For Hololens, the hand tracking sensor consists of a depth camera that observes the hands moving through space. The depth image can be used to segment the hand from the background and the rest of the body, classify pixels as belonging to different hand parts using decision trees/jungles, and compute centroids for them (palm, fingertips, etc.) in 3D space.

The hand tracking sensor is factory calibrated relative to the environment tracking components on board of the HMD, allowing for the hand position to be transformed to a gravity aligned world frame of reference. The hand(s) can also be classified into several hand poses (open, closed, pointing, bloom etc.).

Once a specific controller is matched with a specific hand, the location data (x, y and z coordinates) of the hand and the orientation data ($\theta_{pitch}$, $\theta_{yaw}$ and $\theta_{roll}$) of the IMU are combined to determine the 6DOF transform of the Controller in the world frame of reference.

The HMD and the Controller frames of reference are both gravity aligned (z axis is shared). In the embodiment where the HMD and the Controller are both gravity aligned and north aligned, then they are rotationally invariant. If the two frames of reference are not north-aligned, then there is an azimuth offset between the two frames of reference that needs to be resolved in one of several ways. For example, in a scenario where there is a 3D cursor (such as gaze targeting against 3D content), the cursor has a 3D location. For a manipulation gesture, the azimuth offset is calculated at the time of the button press by aligning the IMU forward vector with the vector between the hand and the cursor and is maintained constant throughout the manipulation gesture, when the button is released. For example, one way to determine the azimuth offset and calibrate the Controller to the HMD's frame reference is to have the user point at a virtual object and calculate the azimuth delta between the HMD's frame of reference and the Controller's frame of reference. Alternatively, a coarse estimate of the hand orientation could also be used to initially estimate the azimuth offset and update it gradually over time using a moving average approach. Such a coarse estimate could be based on the segment between lower arm centroid and palm centroid provided by a hand tracking pipeline.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

As discussed in greater detail below, the invention is also directed to methods for recovering six degrees of freedom (6DOF) relative to a wireless hand-held inertial controller when used in combination with a head mounted display. In one embodiment, the method can include one or more of the following acts: detecting by an optical sensor of the head mounted display device, the presence of a user's hand within the field of view of the optical sensor; determining by the head mounted display device if a wireless hand-held inertial controller is active and paired with the head mounted display device; tracking by the optical sensor of the head mounted display device movement of the user's hand relative to the head mounted display over a period of time to derive trajectory data representative of the trajectory of the user's hand during the period of time; receiving by the head mounted display device acceleration data for the period of time from the wireless hand-held inertial controller as derived by the inertial measurement unit of the wireless hand-held inertial controller; comparing the trajectory data with the acceleration data to compute a confidence level that the wireless hand-held device is located in the user's hand; and if the confidence level meets or exceeds a predetermined minimum threshold, fusing the location data derived from the optical sensor of the head mounted display device with the orientation data derived from the inertial measurement unit of the wireless hand-held inertial controller to track the user's hand within three dimensional space with six degrees of freedom.

Figure 9:
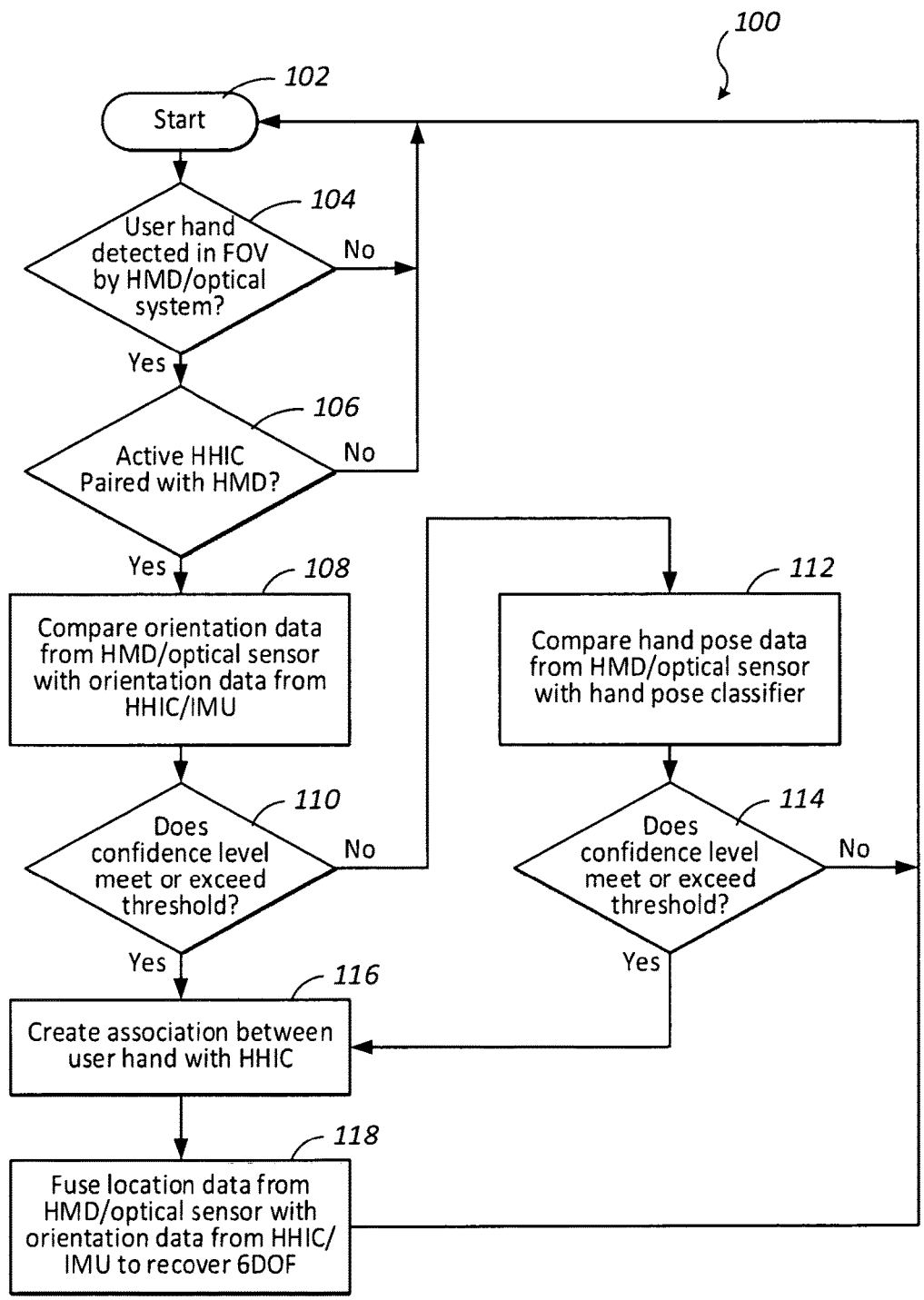
FIG. 9 is a flowchart of one embodiment of a method for determining the location and orientation of a hand-held inertial controller with six degrees of freedom.

Referring now to FIG. 9, a method 100 for recovering six degrees of freedom (6DOF) relative to a wireless hand-held inertial controller when used in combination with a head mounted display is illustrated. The process starts at block 102. For each frame of video captured by the optical sensor of the HMD device, the hand tracking component of the HMD analyzes the video data to determine if a user's hand is located within the field of view of the HMD's optical sensor as indicated at step 104. If so, the process continues to step 106. If not, the process returns to step 102.

At step 106, the processor of the HMD device checks to see if it is paired with any active hand-held Controller. If so, the process continues to step 108. If not, the process returns to step 102.

At step 108, for several video frames (i.e., over some period of time) the optical sensor of the HMD tracks movement of the user's hand relative to the head mounted display over a period of time to derive trajectory data representative of the trajectory of the user's hand during the period of time. In addition, the HMD receives acceleration data for the same period of time from the Controller as derived by the IMU of the wireless hand-held inertial controller. The HMD then compares the trajectory data with the acceleration data to compute a confidence level that the wireless hand-held device is located in the user's hand. Then, as indicated at step 110, if the confidence level meets or exceeds a predetermined threshold, then the process continues to step 116. If not, the process continues with step 112.

Alternately, step 108 can be performed as follows. The processor of the HMD retrieves orientation data from the IMU of the Controller and compares it to the orientation data the HMD derives from its optical sensors. The processor of the HMD then computes a confidence level based on the correlation or lack thereof between the orientation data from the Controller and the orientation data from the HMD. As indicated at step 110, if the confidence level meets or exceeds a predetermined threshold, then the process continues to step 116. If not, the process continues with step 112.

At step 112, the hand pose component of the HMD compares the pose detected in the video frame against a pose classifier and calculate a confidence level based on the correlation or lack thereof between the hand pose as detected in the video frame and hand poses consistent with the Controller being held in the user's hand. As indicated at step 114, if the confidence level meets or exceeds a predetermined threshold, then the process continues to step 116. If not, the process returns to step 102.

If the process reaches step 116, that means that there is a sufficient confidence level to create an association between the detected user hand and the Controller, and such association is created. Such association is persisted unless and until further analysis demonstrates that the association is no longer valid based on subsequent confidence level calculations.

Once the association is established, the process continue to step 118 and the location data derived from the optical sensors of the HMD and the orientation data derived from the IMU of the Controller are fused, thereby recovering 6DOF in relation to the Controller. Then the process continues by returning to block 102 for continued processing of subsequent frames of captured video.

Further, the systems and methods described above may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks.

In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
    a head-mounted display device (HMD') comprising:
        a processor;
        a wearable stereoscopic display adapted for displaying one of an augmented reality (AR) environment or a full virtual reality (VR) environment; and
        an optical sensor system that produces location data at a particular instant of time for a wireless hand-held input controller, wherein the location data is obtained from a depth camera mounted on the HMD, and wherein the location data is defined by x, v and z coordinates;
    the wireless hand-held input controller comprising:
        an inertial measurement unit (IMU) comprising one or more sensors for determining orientation data of the wireless hand-held input controller and wherein the orientation data is defined by pitch (elevation angle), yaw (azimuth angle) and roll (rotation) relative to a predetermined frame of reference; and
        a microcontroller that communicates to the processor of the HMD one or more user inputs relative to the orientation data; and
    wherein the processor of the HMD uses the orientation data at the particular instant of time as provided by the IMU of the wireless hand-held input controller and the location data at the particular instant of time as provided by the optical sensor system of the HMD to determine location and orientation of the wireless hand-held input controller in reference to the HMD with six degrees of freedom as derived from the x, v and z coordinates determined at the HMD and the yaw, pitch and roll coordinates determined at the IMU of the wireless hand-held input controller.

2. The system of claim 1, wherein the HMD further comprises an on-board image production system mounted on the HMD.

3. The system of claim 1, wherein the HMD comprises a virtual reality display.

4. The system of claim 1, wherein the HMD comprises a three dimensional, augmented reality display.

5. The system of claim 1, wherein the wireless hand-held input controller comprises one or more momentary switches that are operatively connected to, and selectively provide inputs to, the microcontroller, one more status LEDs operatively connected to the microcontroller, and a wireless radio operatively connected to the microcontroller for transmitting user inputs and orientation data to the processor of the HMD.

6. The system of claim 5, wherein the IMU comprises one or more of a 3-axis accelerometer, a 3-axis gyroscope and a 3-axis magnetometer.

7. The system of claim 6, wherein the orientation data comprises $\theta_{pitch}$, $\theta_{yaw}$ and $\theta_{roll}$ coordinates.

8. The system of claim 7, wherein the depth camera is an infrared camera.

9. The system of claim 1, wherein the HMD further comprises an inward facing optical sensor that detects a gaze direction of a user's eyes.

10. The system of claim 1, wherein the HMD further comprises an on-board position sensor system mounted to the HMD.

11. The system of claim 10, wherein the position sensor system mounted to the HMD comprises an inertial measurement unit (IMU) comprising one or more of:
    a 3-axis accelerometer;
    a 3-axis gyroscope;
    a 3-axis magnetometer;
    a global positioning system; and
    a multilateration tracker.

12. The system of claim 1, wherein the determined location and orientation of the wireless hand-held input controller is determined in reference to x, y, z, $\theta_{pitch}$, $\theta_{yaw}$ and $\theta_{roll}$ coordinates within a real world frame of reference.

13. In a system comprising a head mounted display device (HMD) configured to display a three-dimensional space for an augmented reality (AR) environment or a full virtual reality (VR) environment, wherein the HMD comprises a forward facing optical sensor having a field of view, and wherein the HMD interfaces with a wireless hand-held input controller that provides user input to the HMD, a computer-implemented method for determining and tracking location and orientation of the wireless hand-held input controller in reference to the HMD, and wherein the determined location and orientation are determined with six degrees of freedom, the computer-implemented method comprising:
    detecting with the forward facing optical sensor the presence of a user's hand within the field of view;
    determining if the wireless hand-held input controller is active and paired with the HMD;
    tracking with the forward facing optical sensor movement of the user's hand relative to the HMD over a period of time;
    generating trajectory data representative of the trajectory of the user's hand during the period of time;
    generating acceleration data for the period of time from the wireless hand-held input controller, wherein the acceleration data is derived by an inertial measurement unit (IMU) of the wireless hand-held input controller;
    receiving at a processor of the HMD the trajectory data and the acceleration data and comparing the trajectory data with the acceleration data to compute a confidence level that the wireless hand-held input controller is located in the user's hand; and
    if the confidence level meets or exceeds a predetermined minimum threshold, combining location data representative of a location of the user's hand as derived from the forward facing optical sensor of the HMD with orientation data representative of an orientation of the user's hand as derived from the IMU of the wireless hand-held input controller in order to track the user's hand within the three dimensional space of the AR or VR environment with six degrees of freedom.

14. The method of claim 13, wherein detecting the presence of the user's hand within the field of view comprises:
capturing, by the forward facing optical sensor of the HMD, a plurality of successive frames of video; and
for each frame of video captured by the forward facing optical sensor of the HMD, analyzing video data captured by the HMD to determine if a user's hand is located within the field of view of the HMD's forward facing optical sensor.

15. The method of claim 13 further comprising:
receiving from the wireless hand-held input controller first orientation data from the IMU of the wireless hand-held input controller, wherein the first orientation data is received at the processor of the HMD and is representative of the orientation of the wireless hand-held input controller derived from the IMU of the wireless hand-held input controller;
computing at the processor of the HMD second orientation data representative of the orientation of the wireless hand-held input controller, wherein the second orientation data is computed based on pose data detected by the forward facing optical sensor of the HMD; and
computing at the processor of the HMD a confidence level by comparing the first orientation data with the second orientation data.

16. The method of claim 15 further comprising creating an association between the user's hand and the wireless hand-held input controller if the confidence level meets or exceeds a predetermined minimum threshold.

17. The method of claim 16 further comprising:
periodically monitoring the confidence level of the association between the user's hand and the associated wireless hand held input controller;
if the confidence level remains above the predetermined minimum threshold, persisting the association; and
if the confidence level drops below the predetermined minimum threshold, removing the association.

18. A system used for augmented reality (AR) or full virtual reality (VR) in which a head-mounted display device (HMD) is aligned with a wireless hand-held controller in a manner so that the HMD and wireless hand-held controller are rotationally invariant relative to one another, the system comprising:
a head-mounted display device (HMD) comprising:
an on-board processor mounted to the HMD;
a wearable stereoscopic display adapted for displaying one of an augmented reality (AR) environment or a full virtual reality (VR) environment;
an optical sensor system that produces location data at a particular instant of time for the wireless hand-held controller, wherein the optical sensor system comprises:
an outward facing optical sensor that senses a field of view of the HMD within the environment such that location data is obtained from the outward facing optical sensor, and wherein the location data is defined by x, y and z coordinates; and
a position sensor system comprising one or more sensors for determining orientation data of the HMD and wherein the orientation data for the HMD is defined by pitch (elevation angle), yaw (azimuth angle) and roll (rotation) relative to a predetermined frame of reference;
a wireless hand-held controller comprising:
an inertial measurement unit (IMU) comprising one or more sensors for determining orientation data of the wireless hand-held controller and wherein the orientation data of the wireless hand-held controller is defined by pitch (elevation angle), yaw (azimuth angle) and roll (rotation) relative to the particular frame of reference; and
a microcontroller that communicates to the on-board processor of the HMD one or more user inputs relative to the orientation data of the wireless hand-held controller; and
wherein the on-board processor of the HMD performs at least the following:
processes the orientation data at the particular instant of time as provided by the IMU of the wireless hand-held controller and the location data at the particular instant of time as provided by the optical sensor system of the HMD to determine location and orientation of the wireless hand-held controller in reference to the HMD with six degrees of freedom as derived from the x, y and z coordinates determined at the HMD and the yaw, pitch and roll determined at the IMU of the wireless hand-held controller; and
processes the orientation data at the particular instant of time as provided by the position sensor system of the HMD and the orientation data at the particular instant of time as provided by the IMU of the wireless hand-held controller such that the HMD and the wireless hand-held controller are gravity aligned and north aligned so as to be rotationally invariant.

* * * * *